May 13, 1958   J. SUGRUE ET AL   2,834,538
APPARATUS FOR TESTING AND CLEARING
Filed Dec. 4, 1956   2 Sheets-Sheet 1
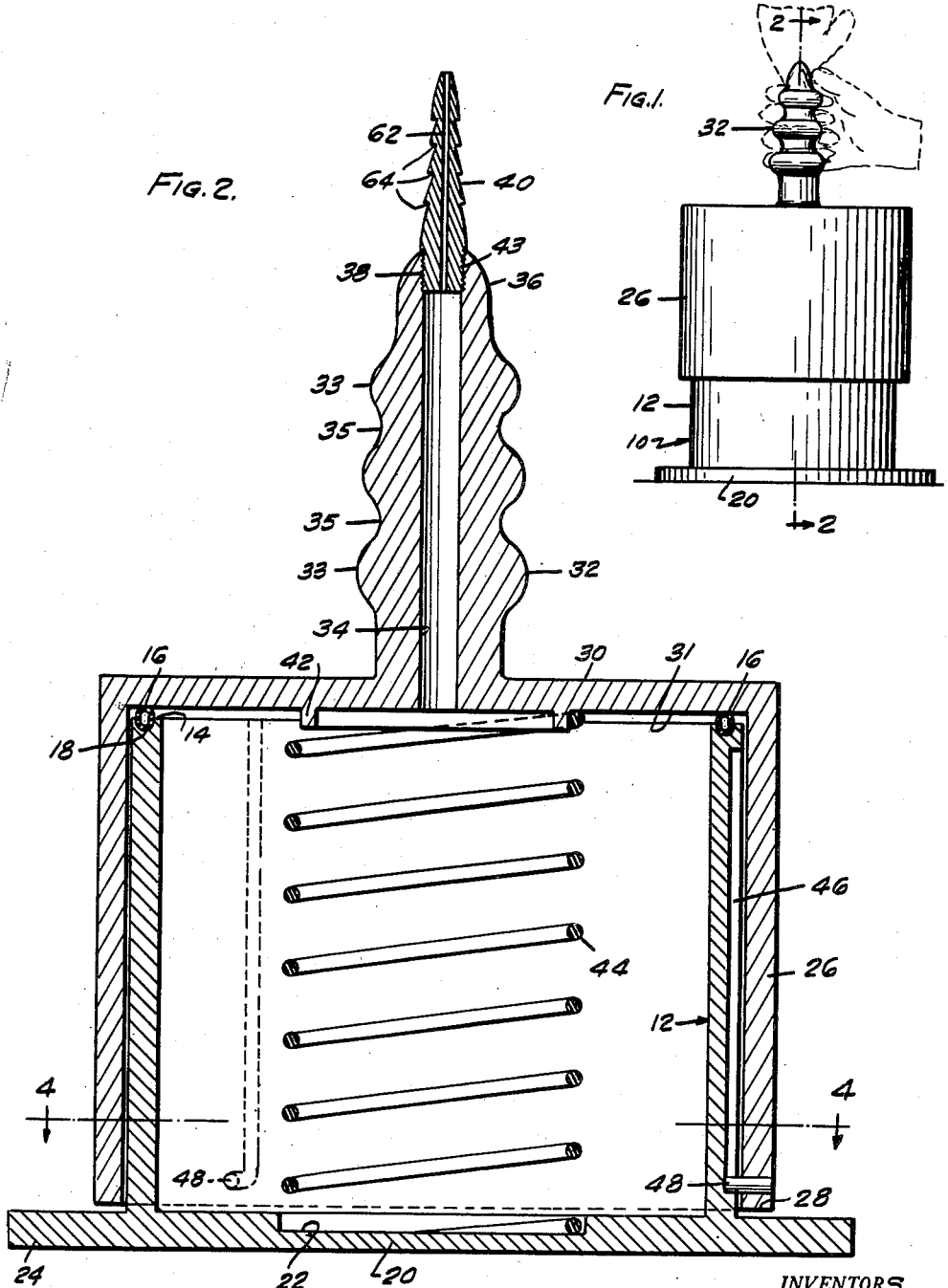
INVENTORS.
JOSEPH SUGRUE
JAMES ANSTETT
BY
Harry H. Hitzeman
Attorney May 13, 1958 J. SUGRUE ET AL 2,834,538
APPARATUS FOR TESTING AND CLEARING
Filed Dec. 4, 1956 2 Sheets-Sheet 2

INVENTORS.
JOSEPH SUGRUE
JAMES ANSTETT
BY
Harry H. Hitzeman
Attorney

United States Patent Office

2,834,538
APPARATUS FOR TESTING AND CLEARING
Joseph Sugrue and James Anstett, Chicago, Ill.

Application December 4, 1956, Serial No. 626,195

4 Claims. (Cl. 230—174)

Our invention relates to apparatus for testing and clearing various equipment usually found in hospitals and physicians' and surgeons' offices.

Our invention relates more particularly to a hand operated apparatus for testing articles such as surgeons' rubber gloves and similar equipment prior to sterilizing and use so that there is a certainty that there are no leaks or holes in these articles. Further, the apparatus may be used with an adapter for clearing pipettes, burettes, catheters, and rubber or glass tubing.

Essentially the apparatus comprises a movable cup-shaped open-ended cylinder provided on its closed end with a nozzle portion, the same being adapted to be fitted over and telescopically slidable on a similar open-faced cylindrical chamber member formed with a base so that the apparatus may be positioned upon a table or other suitable horizontal surface.

The principal object of the invention is to provide an apparatus of the class described that is comparatively simple in construction and capable of easy and effective operation for directing a stream of air under pressure into an object either to be blown up to test for openings in the same, or to clean or clear out articles such as pipettes, burettes, catheters and rubber or glass tubing.

A further object of the invention is to provide apparatus of the class described that is easily operated by one hand of an operator either to direct air under pressure into an article to be cleared or tested, or to release the same for a further operation.

A further object of the invention is to furnish an apparatus of the type described provided with compression means therein for automatically returning the same to an operative position after each use of the same.

Another object of the invention is to provide means in association with apparatus of the class described for locking the same in inoperative position when desired.

Other objects and advantages will be more apparent from the following description wherein reference is had to the accompanying drawings, upon which:

Fig. 1 is a side elevational view of the apparatus showing the same in use for blowing up and testing a surgeon's rubber glove;

Fig. 2 is a cross-sectional view thereof taken generally on the line 2—2 of Fig. 1;

Figure 3:
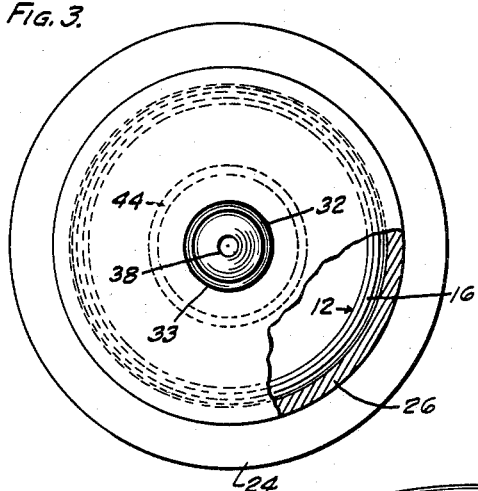
Fig. 3 is a plan view thereof.
Figure 6:
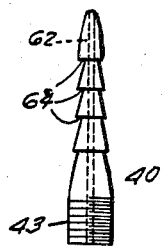
Fig. 6 is a side elevational view of the adapter shown in cross-section in Fig. 2.

In the embodiment of the invention which we have chosen to illustrate and describe the same, we provide a base member 10 which has a vertically disposed cylindrical wall 12 terminating in an open-ended mouth 14. An O-ring 16 may be fixedly mounted in a peripheral groove 18 in the top edge of the cylindrical wall 12. The base member has a floor 20 provided with a medially disposed circular bore 22 and with a lateral peripheral flange 24.

We provide a cup-shaped cylindrical member 26 adapted to telescope over the cylindrical housing 12 of the base member 10, the member 26 having an open end 28 and an upper transverse wall 30. A nozzle member 32 extends upwardly from the transverse wall 30, the nozzle member being provided with a centrally located bore 34 which terminates in a reduced end 36. The bore 34 may have a tapped portion 38 in the end 36 of the nozzle for the reception of an adapter 40 when desired.

The lower side of the transverse wall 30 may be provided with a circular ridge 42 concentric to the bore 34 of the nozzle 32 for locating a compression spring 44 whose lower end is adapted to seat in the bore 22 of the base 10.

As thus far described we have provided an apparatus which is essentially a pumping mechanism, the nozzle being gripped by the hand to press the cup-shaped cylindrical member down against the tension of spring 44 to direct air under pressure outwardly through the bore 34 of the nozzle. In order to prevent rotation of the cylindrical member 26, we have provided a plurality of vertical grooves 46 in the outside surface of the cylindrical wall of the housing 12 and have mounted guide pins 48 in the wall of the cylindrical member 26, the slots 46 terminating below the top end of the base housing 12 and sufficiently above the base flange 24 to prevent the bottom of the cylindrical member 26 from hitting the base flange 24. However, in its lowermost position, the bottom surface 31 of the transverse wall 30 will slightly compress the O-ring 14 so that a seal is formed therein, thus preventing the escape of air that has been blown into a glove or other article.

In the event that it is desired to lock the member 26 in a down position, the member may be rotated slightly, the grooves 46 all terminating at their lower end in a bayonet slot 47. This serves as an effective lock-down when desired.

Figure 5:
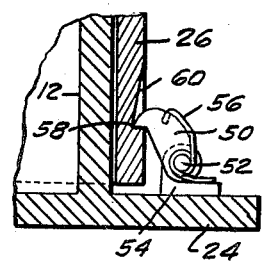
Fig. 5 is a fragmentary sectional view showing a modified form of locking and holding device.
Figure 4:
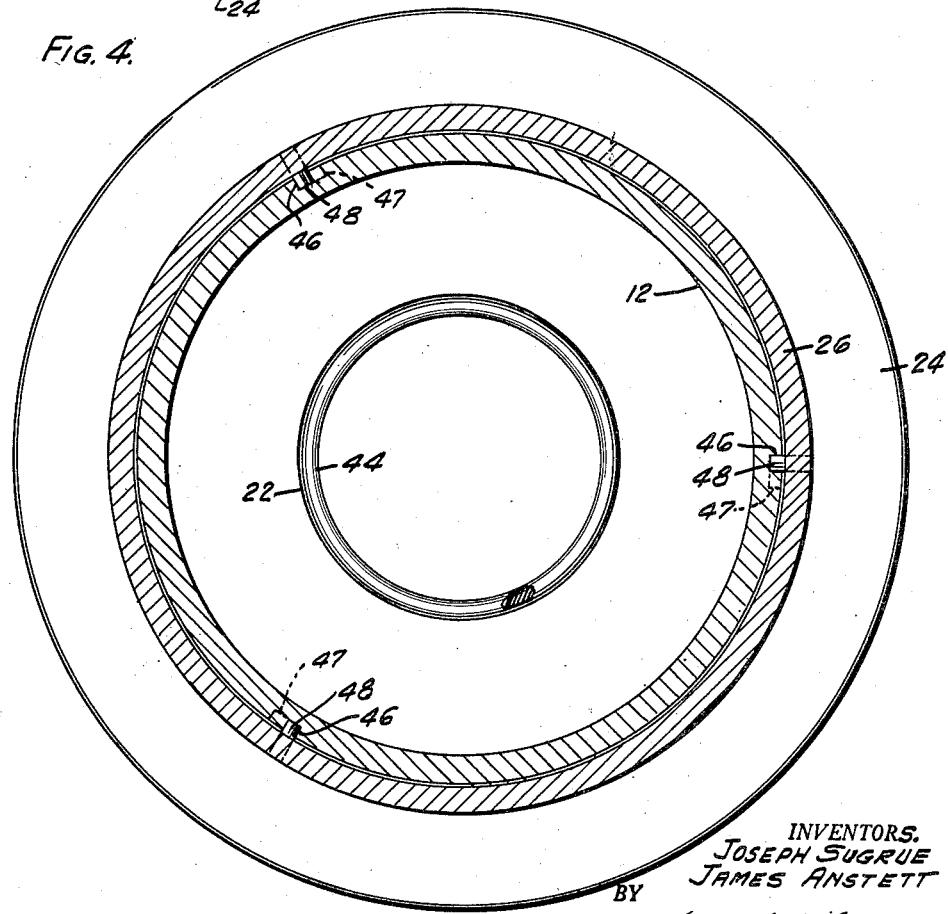
Fig. 4 is a plan sectional view taken generally on the line 4—4 of Fig. 2.

As best shown in Fig. 5, we have also provided a modified lock-down member which consists of a dog 50 mounted on a pin 52 carried by an upstanding lug 54 on the base flange 24. The dog 50 is under the control of a grasshopper spring 56 which normally presses the tooth 58 of the dog against the wall of the cylindrical member 26, the wall having a notch 60 therein which is engaged by the tooth 58 when the cylindrical member is pressed downwardly to the end of a stroke, thus holding the cylindrical member down until the dog 50 is released.

The nozzle 32 is preferably provided with a plurality of grooves and ridges 33 and 35 for convenience in gripping a glove or other article about the same in an air-tight manner.

As thus far described it can be seen that we have provided a comparatively simple and easily operable mechanism for testing gloves, balloons or other similar objects. Without the use of the lock-down mechanism, an object is held on the nozzle 32 in one hand of an operator, and with the same hand he will press down, moving the cylindrical member down against the compression spring 44 and blowing up the article that he is holding on the nozzle. If the object tests satisfactorily, he can then release the article from the nozzle and the coiled spring 44 will raise the cylindrical member 26 to operative position for the next testing.

The same apparatus may be used for clearing pipettes, burettes or other objects which have previously been mentioned. However, for this purpose the adapter 40 is utilized, the same being provided with a screw-threaded extension 42 received in the tapped opening 38 at the end of the nozzle. The adapter has a medial bore 62 and is provided on its outer surface with a series of stepped ridges 64 for receiving the end of a rubber hose or other object that is pressed down over the same for testing or clearing.

When the adapter is used the operation of the apparatus is the same as has been previously described for testing inflatable rubber gloves or other articles.

From the above and foregoing description it can be seen that we have provided a comparatively simple yet effective apparatus for testing inflatable articles and for clearing or cleaning out devices such as pipettes, burettes, tubing, etc. The construction is comparatively simple yet highly efficient in operation and under test has proven very satisfactory in use.

While we have illustrated and described a specific embodiment of the invention, it will be apparent to those skilled in the art that changes and modifications may be made in the exact details shown and we do not wish to limit ourselves in any particular; rather what we desire to secure and protect by Letters Patent of the United States is:

1. Apparatus of the class described comprising a base member having an upwardly extending open-ended cylinder, an inverted cylindrical member adapted to be telescopically positioned over the same for reciprocation, said cylindrical member having an open end and a transverse wall, a nozzle member positioned axially thereof and extending upwardly from said wall, a central bore in said nozzle member and spring means positioned between said base and said transverse wall for normally holding said cylindrical member in an extended position, and means limiting the reciprocal travel of said cylindrical member, said means including vertical slots in the outside wall of said open-ended cylinder and pin members extending inwardly from the inside wall of said cylinder member engaging said slots.

2. Apparatus of the class described comprising a base member having an upwardly extending open-ended cylinder, an inverted cylindrical member adapted to be telescopically positioned over the same for reciprocation, said cylindrical member having an open end and a transverse wall, a nozzle member positioned axially thereof and extending upwardly from said wall, a central bore in said nozzle member, spring means positioned between said base and said transverse wall for normally holding said cylindrical member in an extended position, means limiting the reciprocal travel of said cylindrical member, said means including vertical slots in the outside wall of said open-ended cylinder and pin members extending inwardly from the inside wall of said cylinder member engaging said slots, said vertical slots having a right-angle bend at their lower ends for making a bayonet joint connection with said pins on slight rotation of said cylindrical member.

3. Apparatus of the class described comprising a base member having an upwardly extending open-ended cylindrical housing, a plurality of vertical grooves on the outside surface of said housing, a floor in said base having a medially disposed cylindrical bore, an inverted cup-shaped cylindrical member adapted to be telescoped over said base member, said cup-shaped member having a nozzle portion thereon, said nozzle having a bore therein, a circular raised flange on the lower side of the transverse wall of said cylindrical member, a coiled spring between the floor of said base member and the underside of the transverse wall of said cylindrical member, said spring positioned in the bore on said floor and about the circular ridge on said transverse wall, and guide pins in the wall of said cylindrical member extending into the slots of said base member, said slots terminating at their lower end in a transverse bayonet slot portion.

4. Apparatus of the class described comprising a base member having an upwardly extending open-ended cylindrical housing, a plurality of vertical grooves on the outside surface of said housing, a floor in said base having a medially disposed cylindrical bore, an inverted cup-shaped cylindrical member adapted to be telescoped over said base member, said cup-shaped member having a nozzle portion thereon, said nozzle having a bore therein, a circular flange on the lower side of the transverse wall of said cylindrical member, a coiled spring between the floor of said base member and the underside of the transverse wall of said cylindrical member, said spring positioned in the bore on said floor and about the circular ridge on said transverse wall and guide pins in the wall of said cylindrical member extending into the slots of said base member, said slots terminating at their lower end in a transverse bayonet slot portion, said base member having an O-ring in the upper edge of the same for making a sealed engagement with the transverse wall when the same is in a down position.

References Cited in the file of this patent

UNITED STATES PATENTS

| | | |
|---|---|---|
| 362,263 | Fawcett | May 3, 1887 |
| 489,367 | Brooks | Jan. 3, 1893 |
| 1,926,367 | Booth | Sept. 12, 1933 |

FOREIGN PATENTS

| | | |
|---|---|---|
| 411,573 | Great Britain | June 14, 1934 |